Sept. 26, 1967     G. J. FARKAS ET AL     3,343,792

PROCESS FURNACE CONTROL SYSTEM

Filed June 22, 1965     3 Sheets-Sheet 1

GEORGE J. FARKAS
EUGENE C. MAC MULLAN    INVENTORS

PATENT ATTORNEY

Sept. 26, 1967  G. J. FARKAS ET AL  3,343,792
PROCESS FURNACE CONTROL SYSTEM
Filed June 22, 1965  3 Sheets-Sheet 3

GEORGE J. FARKAS
EUGENE C. MAC MULLAN  INVENTORS

BY *James F. Bryan*

PATENT ATTORNEY

United States Patent Office 3,343,792
Patented Sept. 26, 1967

3,343,792
PROCESS FURNACE CONTROL SYSTEM
George J. Farkas, South Orange, and Eugene C. Mac-Mullan, Wharton, N.J., assignors to Esso Research and Engineering Company, a corporation of Delaware
Filed June 22, 1965, Ser. No. 466,043
5 Claims. (Cl. 236—23)

ABSTRACT OF THE DISCLOSURE

A computer, approximating the furnace response characteristics to changes in variables, is utilized as a feed forward controller for a process furnace to decrease the magnitude and duration of variations in the coil outlet temperature of the furnace associated with variations in the input feed temperature, feed rate, and fuel rate thereto.

---

This invention relates to an improved method of controlling a furnace and relates more particularly to a method of, and apparatus for, reducing variations in the coil outlet temperature of a process furnace.

The process furnaces with which this invention is concerned are used to heat a variety of materials, particularly hydrocarbon materials, such as crudes or distillates, for introduction into process units, including distillation towers, such as ethane-ethylene splitters, pentane splitters, pipe stills, deisobutanizers, and the like. Since the inlet temperature of the feed to such process units must often be within certain critical limits, it is necessary to have a furnace control system that is capable of maintaining a constant coil outlet temperature.

Disturbances in the feed to a process furnace, for example, a change in feed inlet temperature or a change in feed flow rate, have a significant effect upon the coil outlet temperature of the furnace. The problem of feed disturbances has recently become more acute due to the use of heat integration schemes which save fuel and investment costs that would otherwise be needed to cool, store, and reheat intermediate streams in a less-integrated refinery. The price that is paid for the high efficiency of heat integration is a larger fluctuation in the inlet temperature of the furnace. Thus, the degree to which heat integration schemes may be employed in a refinery is frequently limited by the ability of process furnace control systems to absorb these fluctuations without a significant variation in coil outlet temperature.

Process furnaces are conventionally controlled by feed back systems that are operative only when a deviation occurs in the controlled variable, the coil outlet temperature. In such a system the outlet temperature is measured to detect a deviation. A manipulated variable, fuel rate, is modified in response to the detection of a variation in outlet temperature to correct the output. Feed back systems therefore are inherently subject to variations in the controlled variable every time a disturbance occurs in the inputs. Thus, in such a system, a significant disturbance in the feed will cause a substantial variation of long duration in the outlet temperature.

It is an object of this invention to provide a control system for process furnaces which reduces the magnitude and duration of variations in coil outlet temperature which ordinarily occur in response to disturbances in the furnace feed.

It is a further object of this invention to provide a practical, economical method of changing fuel rate in response to a disturbance in the feed in order to reduce variations in the coil outlet temperature.

Another object of this invention is to provide a control system for a furnace which permits a higher degree of heat integration of the overall process.

Other objects will become apparent as one reads the following description of the invention.

The objects of this invention are attained by utilizing a feed forward controller. In the proposed system, feed inlet disturbances are measured, the disturbances are represented by signals, the signals are modified to represent the change in fuel rate required to compensate for the inlet disturbances, and the fuel rate is changed in response to said modified signals. "Disturbance" as used herein, shall mean any variation in feed conditions that would, if corrective action were not taken, cause a variation in the coil outlet temperature. Variations in feed rate and feed inlet temperature are the disturbances that are most often encountered. By sensing the disturbances, one can initiate the corrective action required to eliminate the fluctuation in coil outlet temperature or to limit it to an acceptable minimum. The feed forward control system takes corrective action sooner than a feed back system. Thus, application of feed forward control schemes to systems with slow response or to systems wherein there are large disturbances in inlet conditions is of primary interest.

In a preferred embodiment of this invention, a feed forward controller is used in combination with an essentially conventional feed back control system. In order to eliminate completely the fluctuation of outlet temperature, the feed forward controller would have to be a perfect model of the furnace. Since the use of a perfect model is not feasible, minor fluctuations in the outlet temperature cannot be completely eliminated. If an approximate model of the furnace is employed as a feed forward controller, the fluctuations in outlet temperature can be reduced to a greater extent than is possible with a perfectly tuned feed back system.

If coil outlet temperature response to a fuel rate change or to any feed disturbance is plotted against time, a high order curve is obtained. It would require a very sophisticated and expensive computer to compensate fully for the furnace dynamics represented by the high order response curve. It has been found that for most operations, such a sophisticated computer is not required. In accordance with a preferred embodiment of this invention, the high order curves are approximated as lower order curves, preferably as purely exponential curves. For most operations, it is not practical to design computers which are based upon a more precise approximation of the high order function because the point of diminishing returns is reached as the price of the required computer soars.

In many cases the approximate model suggested herein will be sufficient to control the outlet temperature of the process furnace within the limitations set by the overall process.

However, in those cases where fluctuations in outlet temperature must be reduced to within certain very narrow and critical limits, a second or third order approximation of furnace dynamics may be required. Alternatively and preferably, this invention contemplates the use of a feed back controller in combination with a simple first order feed forward controller rather than the use of a feed forward controller that is a more perfect model of the furnace. In other words the preferred system suggested herein is one that is economically practical, even where the overall process requires that the fluctuation in coil outlet temperature be controlled within very narrow limits.

It should be noted at this point that the role of the feed back controller in this system is different from the role of such a controller where it is the only or primary control system. In the preferred system herein suggested, the main control action is performed by the feed forward controller. The feed back system compensates only for the drift that arises principally from the accumulation of small errors in the feed forward system and other uncontrolled disturbances and brings back the outlet temperature to the desired reference point. In some instances it may be desirable to use the feed back controller for the main control action and to use the feed forward controller suggested herein to trim.

A better understanding of the invention will be attained by reading the following description taken in connection with the attached drawings in which.

Figure 5:
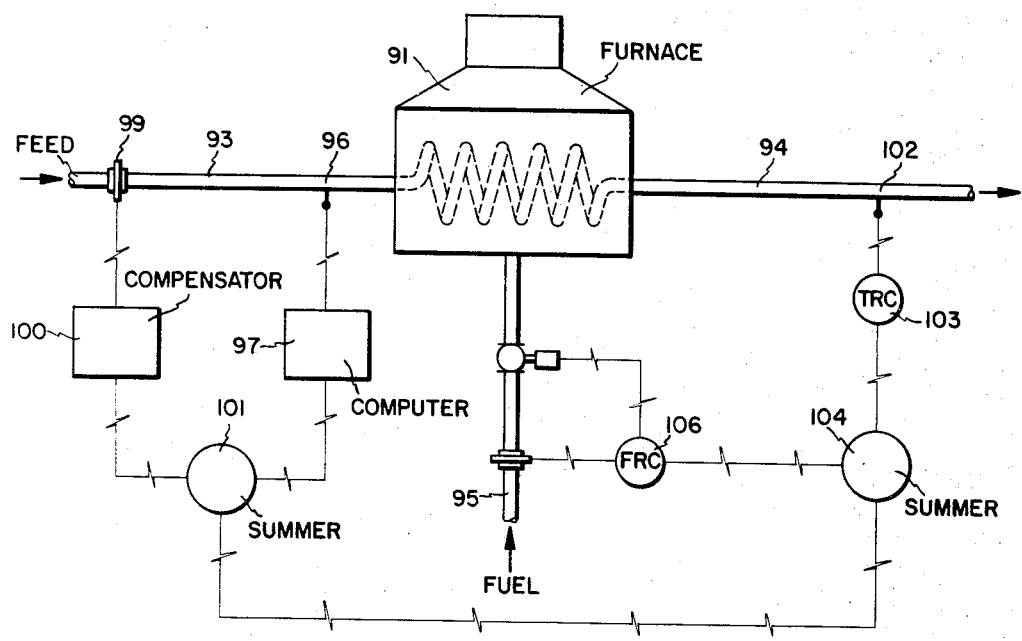

FIGURE 5 schematically depicts the apparatus suitable to control outlet temperature where two disturbances, for example, feed rate and feed temperature, occur.

Figure 6:
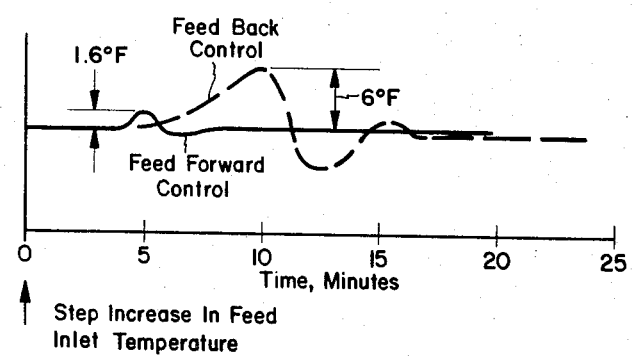

FIGURE 6 is a graph depicting a comparison of the response of conventional feed back control system and the new, practical feed forward control system to a step change in feed inlet temperature.

Figure 1:
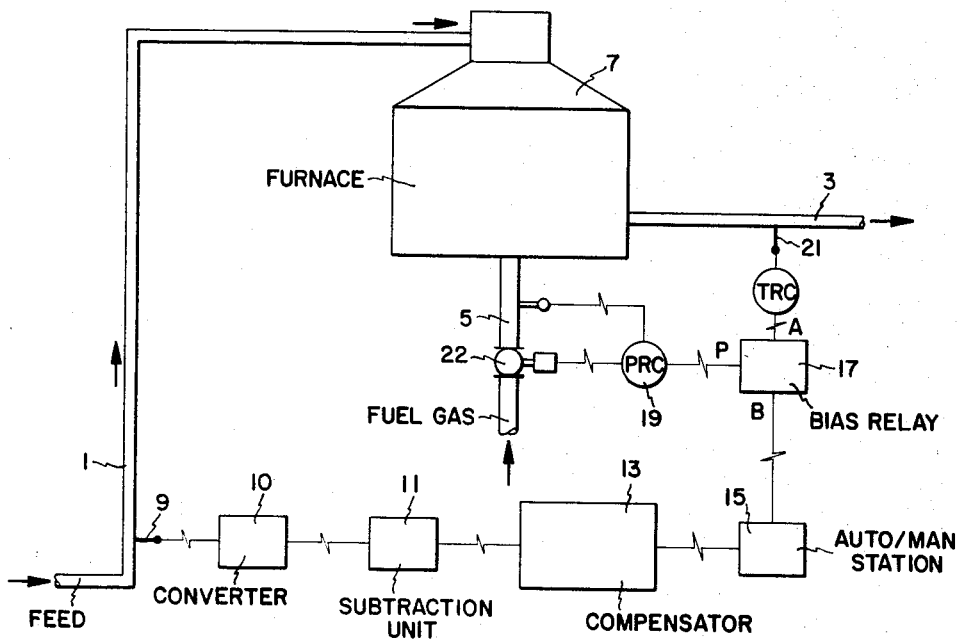
FIGURE 1 is a schematic diagram of apparatus suitable for the practice of the invention to minimize the magnitude and duration of changes in the outlet temperature of process furnace in response to a feed disturbance.

FIGURE 1 depicts a specific embodiment of the invention wherein the disturbance measured is the change in feed inlet temperature. A feed inlet line 1, outlet line 3, and fuel inlet line 5 communicate with the process furnace 7. Line 3 leads to a process unit such as a pipe still (not shown). A thermocouple 9 measures the feed inlet temperature. A converter 10 changes the millivolt signal to a current signal for introduction into a subtraction unit 11. The subtraction unit 11 subtracts a signal representing the normal feed inlet temperature from the signal representing the measured temperature, and transmits a signal representing the disturbance in feed inlet temperature to the feed disturbance compensator 13 which is a computing element, for example, an analog computer. The feed disturbance compensator 13, an approximate model of the furnace, modifies the disturbance signal to a signal which represents the calculated change in fuel rate required to compensate for the feed disturbance. The modified signal is sent into a conventional auto/manual station 15 to avoid upsetting the furnace operation upon introduction of the initial signal. The modified signal, represented as B in FIGURE 1, is transmitted to a device for summing two signals, for example, a bias relay 17, the operation of which is described hereinafter.

The feed disturbance compensator 13 is a computer that represents a low order approximation, preferably a purely exponential approximation, of the high order responses of the furnace. Such a computer may be sufficient for many operations to control the coil outlet temperature within the defined limits. If such is the case, the signal B would be introduced directly to the fuel rate controller 19 rather than into the bias relay 17. However, because of the inherent inexactness of the furnace model and other disturbances, a conventional feed back system is utilized to trim the control of the process furnace. If the feed back system is used, a thermocouple 21 may be employed to measure the coil outlet temperature. The signal thus obtained is sent to a conventional feed back controller 3 which modifies the signal to compensate for the minor changes in coil outlet temperature. This signal, represented by A, is algebraically added to signal B in the bias relay 17. The combined signal, P, is fed to a controller 19 which actuates valve 22 to change the fuel rate in order to compensate for the feed disturbance and/or change in coil outlet temperature.

Although discussed in detail hereinafter, the reader should briefly review FIGURE 6 in order to realize that the simple, relatively inexpensive control system described in FIGURE 1 is a significant improvement over the control system where only feed back control is utilized.

The feed forward controller that can be used in accordance with this invention is characterized by the following control equation:

$$\Delta M = K_{ff}\left(\frac{1+T_1S+T_3S^2+T_5S^3+\ldots}{1+T_2S+T_4S^2+T_6S^3+\ldots}\right)e^{-\tau s}\Delta U$$

The preferred feed forward controller of this invention is characterized by the following control equation:

$$\Delta M = K_{ff}\left(\frac{1+T_1S}{1+T_2S}\right)e^{-\tau s}\Delta U$$

$\Delta M$—designates the incremental adjustment in the manipulated variable necessary to compensate for any feed inlet disturbance.

$K_{ff}$—designates the steady state gain factor between feed disturbance and fuel firing rate. "Steady state gain factor" as used herein shall mean $K_2/K_1$ as explained hereinafter.

$T_1$—"Major lead time constant" as used herein shall mean the time constant of the exponential curve that approximates the high order curve representing the coil outlet temperature response to a change in fuel rate.

Figure 2:
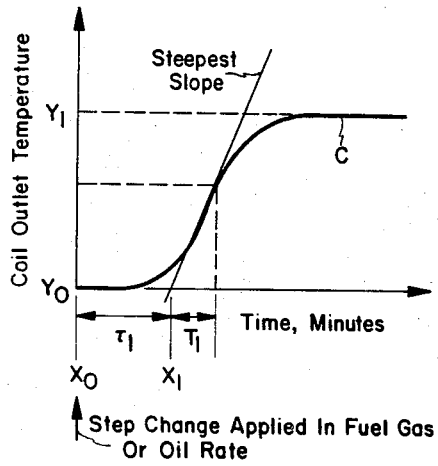
FIGURE 2 is a graph depicting coil outlet temperature response to a change in fuel rate.

A typical curve of coil outlet temperature response to a change in fuel rate is shown in FIGURE 2 wherein a step change in fuel rate occurs at time $X_0$. No variation in coil outlet temperature is observed until time $X_1$. The high order response curve C has many time constants. However, in accordance with this invention, the time constant of a purely exponential curve which approximates the higher order curve is used as a design parameter.

The lead time constant can be obtained approximately from a plot such as FIGURE 2 by determining the time it takes for 63% of the response ($Y_1-Y_0$) to occur. The dead time ($X_1-X_0$) must be subtracted from the time it takes for 63% response. In many instances, the time constant thus obtained will not substantially differ from the time constant of an exponential curve that approximates the higher order curve. In a preferred method, an exponential curve is drawn that approximates the higher order curve, and the time required for 63% of the response is determined therefrom. In both instances, the dead time, $\tau_1$, is subtracted from the total time. Both methods give the time constant of the exponential curve that approximates the higher order curve.

$T_2$—"Major lag time constant" as used herein shall mean the time constant of the exponential curve that approximates the high order curve representing the coil outlet temperature response to a feed disturbance.

Figure 3:
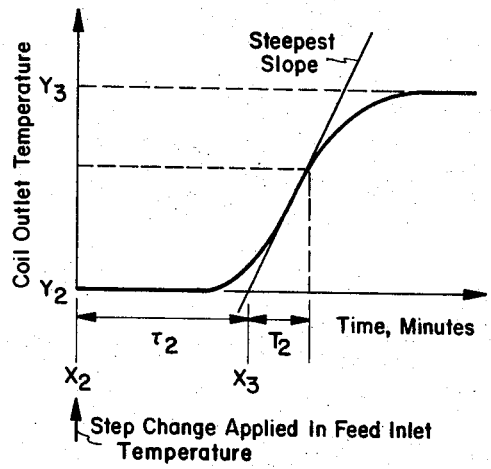
FIGURE 3 is a graph depicting coil outlet temperature response to a feed disturbance.

FIGURE 3 depicts such a high order response curve. The methods of obtaining the lag time constant are the same as those described above for obtaining the lead time constant. One must determine the time it takes for 63% of the response ($Y_3-Y_2$) to occur. Or, preferably, the higher order curve is first approximated with an exponential curve and the time for 63% response is determined. There will usually be very little difference between the constants calculated by the two methods. The dead time ($X_3-X_2$) must be subtracted from the time.

$\tau$—The "dead time of the furnace" is the dead time, $\tau_2$ (see FIGURE 3), observed in the open-loop test made to determine the response of the coil outlet temperature to a feed disturbance minus the dead time, $\tau_1$ (see FIGURE 2), observed in the open-loop test made to determine the response of coil outlet temperature to a change in fuel rate.

$\Delta U$—The disturbance, $\Delta U$, designates a disturbance in the feed, for example, in the feed rate or in feed temperature.

S—Laplace operator.

In order to obtain data for a response curve such as the one depicted in FIGURE 2, an open-loop test is performed wherein the fuel rate is varied and the change in coil outlet temperature is observed. The transfer relationship is represented approximately by the following equation:

$$\frac{\text{change in coil outlet temperature}}{\text{change in fuel gas rate}} = \frac{K_1 e^{-\tau_1 s}}{1+T_1 S}$$

(Equation 1)

$\tau_1$ is determined from the curve such as shown in FIGURE 2 and $T_1$ is calculated as described above. The relationship between change in coil outlet temperature and change in fuel gas rate is known; thus $K_1$ can be calculated.

Similarly, for the determination of a response curve such as shown in FIGURE 3, an open-loop test is performed wherein a feed variable, e.g. feed inlet temperature, is changed. The transfer relationship is represented approximately by the following equation:

$$\frac{\text{change in coil outlet temperature}}{\text{change in inlet temperature}} = \frac{K_2 e^{-\tau_2 S}}{1+T_2 S}$$

(Equation 2)

By dividing Equation 2 by Equation 1, one gets the following equation which represents the change in fuel rate required to reduce variation in coil outlet temperature for a feed disturbance:

$$\Delta M = \frac{K_2}{K_1}\left(\frac{1+T_1 S}{1+T_2 S}\right)e-(\tau_2-\tau_1)S\Delta U$$

The above feed forward control equation may be implemented by analog or digital instruments; the analog computer may be pneumatic or electronic. Referring again to FIGURE 1, one sees a scheme for using a computer. The thermocouple 9 measures the inlet variable, U, and transmits a signal to the millivolt to current converter 10. The signal is then sent to a subtraction unit 11 which substracts a signal representing the normal feed inlet temperature. The signal leaving the subtraction unit represents ΔU, the disturbance. The feed temperature compensator 13 modifies ΔU in accordance with the above feed forward control equation to yield a signal representing ΔM, which is represented as B in FIGURE 1.

The task of the feed forward controller is to maintain the coil outlet temperature at some reference point. After a disturbance occurs in the feed inlet, the feed forward controller calculates the magnitude and polarity of the change in the fuel firing rate required to maintain the outlet temperature at the reference point. Although the above control equation can be implemented by a digital computer, an analog computer is preferred for individual applications. If a small electronic analog computer is used as the feed forward controller, a good approximation of the dead time can be easily obtained. In addition, the use of an analog computer permits the separation of the dynamic compensation element, and the steady state element in the model. Moreover, the dead time element can be a separate unit within the dynamic compensation unit. This separation is not only convenient for analysis, but it also permits adjustments of the dead time, lead and lag time constants and steady state gain at the time of installation. Thus, the tuning of the feed forward controller is an easy task. Once the analog computer is installed and tuned, practically no maintenance is needed. Moreover, tuning of the feed forward controller will not cause any problems to operating personnel. The simplicity of the analog computer warrants trouble-free operation.

Figure 4:
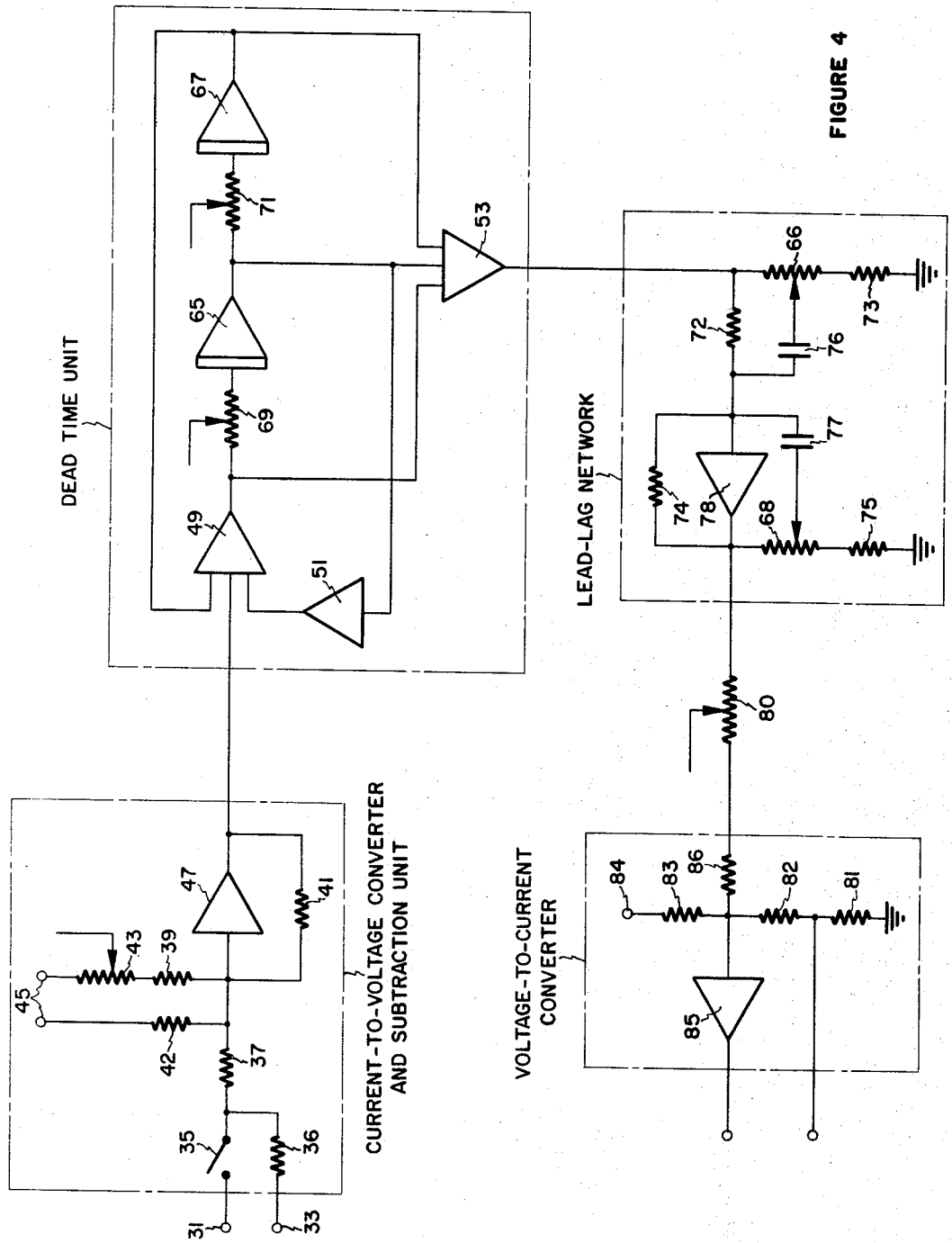
FIGURE 4 is an internal diagram of the circuits for converting the measured feed disturbance signal into a signal for initiating a change in feed rate.

The circuitry for a particular analog computing element is shown in FIGURE 4 wherein terminals 31 and 33 pick up a current signal representing U, a variable such as feed inlet temperature, or feed rate. When switch 35 is closed, the current signal representing U is transferred into a unit which converts the current signal to a voltage signal and algebraically subtracts the desired magnitude of the feed inlet variable from the magnitude of the variable measured in order to obtain a voltage signal representing the feed disturbance, ΔU. The current-to-voltage conversion unit and subtraction unit comprise resistances 36, 37, 39, 41, and 42; voltage source 45; potentiometer 43; and amplifier 47. The voltage signal representing ΔU is fed into the dead time unit, wherein the signal is delayed by the dead time of the furnace, τ. The dead time unit comprises amplifiers 49, 51, and 53; potentiometers 69 and 71; and integrators 65 and 67. The voltage signal leaving the dead time unit is mathematically represented by the factors $\Delta U e^{-\tau s}$. The delayed voltage signal is introduced into the lead-lag network unit for the purpose of applying dynamic compensation. The lead-lag network comprises lead potentiometer 66; lag potentiometer 68; resistances 72, 73, 74, and 75; capacitors 76 and 77; and an amplifier 78. The voltage signal leaving the lead-lag network unit is represented by $$\Delta U e^{-\tau s}\left(\frac{1+T_1 S}{1+T_2 S}\right)$$

This signal is sent to the steady state potentiometer 80 for the application of steady state gain, $K_{ff}$. The signal leaving potentiometer 80 is a voltage signal representing ΔM. This signal is passed into the voltage-to-current converter comprising resistors 81, 82, 86, and 83; voltage source 84; and amplifier 85. The current signal is then sent to the bias relay as shown in FIGURE 1. A constant current, e.g. 8 ma., is applied to the bias relay when there is no feed disturbance. When "B"=8 ma. the output of the bias relay, P, is equal to "A." (See FIGURE 1.)

The computing unit described in FIGURE 4 is an example of the circuitry that can be used in this invention. However, once one has determined the design parameters for obtaining a first-order (or higher order, if necessary) approximation of the change in coil temperature, as described above, other circuitry will come to mind to those skilled in the art. However, it is significant to note that the arrangement suggested herein is preferred because the dead time unit, the lead-lag network, and the gain adjustment are separate elements, thus allowing convenient tuning and maintenance of the device.

The controller described in FIGURE 4 is a first-order, lead-lag-type controller. Very little is gained if a higher order approximation is used for the feed forward controller function. Thus, generally it is not necessary to provide a more complex controller that would be required if a higher order approximation were made. As mentioned above, in some circumstances where the coil outlet temperature must be controlled within very narrow limits, or where there is drift in process conditions, the feed forward control system will need to be adjusted periodically after start-up to eliminate or to reduce the drift to an acceptable level. The adjustment can be accomplished by correcting the steady state gain (see FIGURE 4, No. 80). The feed forward system using an approximate model is always subject to some static error or drift. This means that the purely feed forward control system employing a simple lead-lag-type feed forward controller as suggested herein, or even a higher order controller, will not return exactly to the reference point after a change in the input. Therefore, periodic adjustments of the gain will become necessary when the coil outlet temperature must be controlled within very narrow limits. Since the need to adjust the gain of the computer is undesirable, it has been eliminated in the system of this invention by employing a feed back trim control. It is preferred that the feed back system be used. However, in some instances it may be feasible to employ a computer which is a more perfect model of the furnaces; for example, the computer could represent a second or third order approximation of the furnace functions. This back-up feed back trim will automatically correct any offset, thus making the periodic gain correction unnecessary. Thus, the preferred embodiment of a practical control system for processes wherein the coil outlet temperature must be controlled within very narrow limits is shown in FIGURE 1, wherein a conventional feed back controller is used to trim the control of the process furnace. It must be emphasized, however, that the primary control is performed by the feed forward controller. The role of the feed back controller is restricted in normal operation to eliminating the steady state error.

The conventional feed back controllers can be used for this purpose. For example, cascaded temperature and flow or temperature and pressure controllers may be used. Usually, in the cascaded system the temperature controller has three modes and the flow or pressure controller has two modes. Many existing furnaces are equipped with this type of feed back control system.

FIGURE 5 illustrates schematically a system that can be used in the event that there are two feed disturbances, for example, a change in feed rate and a change in feed temperature. FIGURE 5 shows a process furnace 91 having feed line 93, outlet line 94, and fuel line 95 communicating therewith. The temperature of the feed is measured at point 96 by a suitable means, for example, a thermocouple. The signal obtained is represented by an electrical signal and fed into an analog computer 97 comprising a dynamic compensation unit including a dead time element and a steady state gain unit. The signal leaving the analog computer is $\Delta M'$. The flow rate of the feed stream is measured by a suitable means at point 99, for example an orifice, converted into an electrical signal, and fed into a feed flow rate compensator 100 which could be an analog computer suggested in FIGURE 4. The signal leaving the computer is $\Delta M''$ for the flow rate disturbance. A process furnace always has dead times. The largest process dead time for a furnace is associated with inlet temperature changes. The dead times for feed rate are smaller and in many instances can be ignored altogether. Tests with one furnace indicated that the dead time for inlet temperature changes was 4.7 minutes, whereas the dead time for feed rate changes was approximately 0.8 minute. The furnace should be tested with the aforedescribed procedures to determine computer parameters and whether or not there is a dead time compensation required for feed flow rate. If there is, then the dead time element should be included in the feed flow rate compensator 100. The signals coming from the feed temperature compensator and the feed flow rate compensator are algebraically added in the summer 101. The output signal of summer 101 will be the total $\Delta M$. In this system it is also recommended that a feed back trim be employed. Coil outlet temperature is measured at point 102; the signal thus obtained is modified in the conventional feed back controller 103 and then algebraically added to the sum of the signals from the feed temperature compensator and the feed flow rate compensator in a summer (bias relay) 104. The total signal is then sent to the fuel rate controller 106 which changes the rate of flow of the fuel to compensate for the effect of the disturbances measured.

In order to demonstrate the improvements in controllability of the furnace when the feed forward control system of this invention is used, a comparative analog computer simulation study was made. The objective of this study was to compare the performance of the feed forward control system to that of a conventional feed back control system.

To compare the performance of the feed back control system with the practical feed forward control system of this invention, the furnace was simulated on an analog computer with the use of process transfer functions derived from the response of a mathematical model of the furnace. Second- and third-order approximations of the process transfer functions were used to make the analog computer study as realistic as possible. Each simulated transfer function included dead times, and actual feed back process controllers were used in the simulation. For simulation of the feed forward controller function, a simplified first-order, lead-lag-type transfer function as described hereinabove was employed. The feed forward controller function for inlet temperature change included dead time. Referring to FIGURE 6, one sees that a step change of 40° F. in feed inlet temperature caused a coil outlet temperature deviation of 6° F. when a conventional feed back control system alone was employed. In contrast, the simulated practical feed forward control system allowed only a 1.6° F. deviation and the change in coil outlet temperature existed for a much shorter time.

Other tests were run to simulate changes in feed inlet flow rate. The studies showed that the maximum fluctuation in coil outlet temperature for the feed back system was 6.2° F. when a 70M lb./hr. step disturbance was applied in the feed rate. In contrast, the maximum fluctuation for the feed forward controller of this invention in coil outlet temperature was 0.8° F. for the same step disturbance in feed fuel rate.

It is thus seen that the simple, first-order, lead-lag feed forward control system has the capability to improve the controllability of a furnace. The improvement is achieved by an earlier action in fuel firing rate initiated by the feed forward controller.

It should be noted that in the analog computer study, the furnace was represented by second and third-order transfer functions. The real furnace, however, behaves as a much higher order transfer function. As a consequence, one may reasonably expect a somewhat greater fluctuation in the magnitude of the coil outlet temperature than the one obtained from the analog computer study. Nevertheless, the same percentage improvement is expected for any practical application since the analog computer study was carried out on a relative basis.

The invention has been described with a degree of particularity. Various aspects of the system described herein may be changed or modified without departing from the scope of the invention as herein claimed.

What is claimed is:

1. A method of controlling the outlet temperature of a process furnace comprising obtaining signals representing the magnitude of a disturbance in the feed rate and feed temperature of a fluid flowing to said furnace, delaying each of said signals for a period of time equal to the respective dead time of the furnace for the disturbance detected, modifying the delayed signals to represent the magnitude of the change in fuel rate required to reduce the magnitude of the change in outlet temperature, and changing said fuel rate in response to said delayed modified signal.

2. A method of reducing the magnitude and duration of fluctuations in the outlet temperature of a process furnace comprising obtaining a signal representing the magnitude of a disturbance in the feed to said furnace, delaying said signal for a period of time equal to the dead time of the furnace for the detected disturbance, modifying the delayed signal by the factor of $$K_{ff}\left(\frac{1+T_1S}{1+T_2S}\right)$$

wherein $T_1$ is the major lead time constant for the furnace,
$T_2$ is the major lag time constant for the furnace,
$S$ is the Laplace operator, and
$K_{ff}$ is the steady state gain factor, and changing the fuel flow rate of said furnace in response to said delayed, modified signal.

3. A method according to claim 2 comprising in addition, obtaining a second signal representing the change in outlet temperature, modifying said second signal to represent the change in fuel flow rate required to further reduce the change in outlet temperature, adding algebraically the modified second signal to said delayed, modified signal, and changing the fuel flow rate in response to the algebraic sum of said signals.

4. An apparatus for reducing the magnitude and duration in fluctuations in the outlet temperature of a process furnace comprising a first sensing means for obtaining an electrical signal representing the magnitude of a disturbance of a first characteristic in the feed to said furnace, electronic means for delaying said signal for a period of time equal to the dead time of the furnace for the detected disturbance, analog computing means for modifying the delayed signal from said electronic means by the factor of $$K_{ff}\left(\frac{1+T_1 S}{1+T_2 S}\right)$$

wherein $T_1$ is the major lead time constant for the furnace,
$T_2$ is the major lag time constant for the furnace,
$S$ is the Laplace operator, and
$K_{ff}$ is the steady state gain factor;

a second sensing means for obtaining an electrical signal representing the magnitude of a change in outlet temperature, conventional control means for modifying the signal from said second sensing means to represent the magnitude of the change in fuel flow rate required to further reduce the change in outlet temperature, summing means for algebraically adding the signal from said analog computing means to the signal from said conventional control means, and a second control means for changing the flow rate of the fuel in response to the signal from said summing means.

5. An apparatus in accordance with claim 4 further including a third sensing means in the feed to said furnace for obtaining an electrical signal representing the magnitude of a disturbance of a second characteristic in the feed of said furnace, electronic means for delaying and modifying said signal representative of said third characteristic, and additional summing means for algebraically combining the signals from said first and third sensing means.

References Cited

UNITED STATES PATENTS

| | | | |
|---|---|---|---|
| 2,217,637 | 10/1940 | Junkins | 236—20 X |
| 2,572,253 | 10/1951 | Fellows | 236—23 |
| 3,034,718 | 5/1962 | Freitas. | |
| 3,086,504 | 4/1963 | Profos. | |

EDWARD J. MICHAEL, *Primary Examiner.*